(12) United States Patent
Tamaizumi (10) Patent No.: US 8,862,330 B2
(45) Date of Patent: Oct. 14, 2014

(54) ELECTRIC POWER STEERING SYSTEM (71) Applicant: JTEKT Corporation, Osaka (JP)

(72) Inventor: Terutaka Tamaizumi, Okazaki (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/957,850

(22) Filed: Aug. 2, 2013

(65) Prior Publication Data

US 2014/0058628 A1 Feb. 27, 2014

(30) Foreign Application Priority Data

Aug. 22, 2012 (JP) ................................ 2012-183354

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |
| *G06F 17/00* | (2006.01) |
| *G06F 19/00* | (2011.01) |

(52) U.S. Cl.
USPC .............................................. 701/42; 701/41

(58) Field of Classification Search
USPC ...................................................... 701/41, 42
See application file for complete search history.

(56) References Cited

U.S. PATENT DOCUMENTS

| 6,474,436 B1 | 11/2002 | Konigorski |
| 2002/0005314 A1* | 1/2002 | Takehara et al. .............. 180/443 |
| 2003/0074120 A1* | 4/2003 | Kleinau ......................... 701/41 |
| 2006/0047391 A1 | 3/2006 | Katou |
| 2009/0069979 A1* | 3/2009 | Yamashita et al. .............. 701/42 |

FOREIGN PATENT DOCUMENTS

| EP | 0 974 507 A2 | 1/2000 |
| GB | 2 392 422 A | 3/2004 |
| JP | A-2006-175940 | 7/2006 |

OTHER PUBLICATIONS

Jul. 4, 2014 extended European Search Report issued in European Patent Application No. 13 18 1004.

* cited by examiner

*Primary Examiner* — Imran Mustafa
(74) *Attorney, Agent, or Firm* — Oliff PLC (57) ABSTRACT

An electric power steering system includes a motor control device that controls driving of a motor based on an assist command value, the motor applying assist torque to a steering mechanism. The motor control device computes a first assist component based on steering torque and a vehicle speed. The motor control device computes a second assist component based on the steering torque and the first assist component. The motor control device computes the assist command value by adding the second assist component to the first assist component. The motor control device includes a road information compensation portion that adjusts the second assist component contained in the assist command value. A basic assist component computation portion computes the first assist component in accordance with a degree of adjustment of the second assist component.

5 Claims, 6 Drawing Sheets

ELECTRIC POWER STEERING SYSTEM

INCORPORATION BY REFERENCE/RELATED APPLICATION

This application claims priority to Japanese Patent Application No. 2012-183354 filed on Aug. 22, 2012 the disclosure of which, including the specification, drawings and abstract, is incorporated herein by reference in its entirety.

BACKGROUND OF THE INVENTION

1. Field of the Invention

The invention relates to an electric power steering system that assists driver's steering operation.

2. Discussion of Background

There is known an electric power steering system that applies motor power to a vehicle steering mechanism so as to assist steering operation performed by a driver. Conventionally, as this type of electric power steering system, there has been a system that is described in JP2006-175940 A.

The electric power steering system described in JP2006-175940 A includes a first reference model that determines target steering torque based on a steering angle, and a second reference model that determines a target rudder angle of a steering system (a target steered angle) based on steering torque. Driving of a motor is controlled based on both of the reference models (ideal models). In other words, it is possible to constantly maintain steering torque at an optimal value by a first assist component that is obtained by performing torque feedback control so as to make actual steering torque follow target steering torque. It is also possible to cancel reverse input vibration from steered wheels by a second assist component that is obtained by performing steered angle feedback control that makes an actual steered angle follow a target steered angle.

When a vehicle is traveling, vibration is caused in steered wheels in accordance with a road condition, and the vibration is transmitted to a steering wheel through a steering mechanism. Therefore, a driver is able to grasp the road condition (road information) through the vibration felt by the hands gripping the steering wheel. However, in the electric power steering system described in JP2006-175940 A, vibration that is caused in a steering mechanism in accordance with the road condition is suppressed, and it is thus impossible for a driver to obtain a steering feel (responsive feel) corresponding to the road condition. This is one of factors that cause deterioration in the steering feel.

SUMMARY OF THE INVENTION

The invention provides an electric power steering system that improves a steering feel.

According to a feature of an example of the invention, an electric power steering system includes an assist mechanism that applies assist torque from a motor to a vehicle steering mechanism, and a control portion that controls driving of the motor based on an assist command value. The control portion includes a first assist component computation portion that computes a first assist component based on steering torque transmitted to the steering mechanism, a steered angle command value computation portion that computes a steered angle command value, which serves as a target value of a steered angle of steered wheels, based on the steering torque, a second assist component computation portion that computes a second assist component by performing steered angle feedback control that matches the steered angle of the steered wheels with the steered angle command value, an assist command value computation portion that computes the assist command value based on a value obtained by adding the second assist component to the first assist component, and an adjusting portion that adjusts an absolute value of the second assist component contained in the assist command value so that the absolute value of the second assist component is decreased, based on a given condition. The first assist component computation portion computes the first assist component in accordance with a degree of adjustment of the second assist component when the second assist component is adjusted by the adjusting portion.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
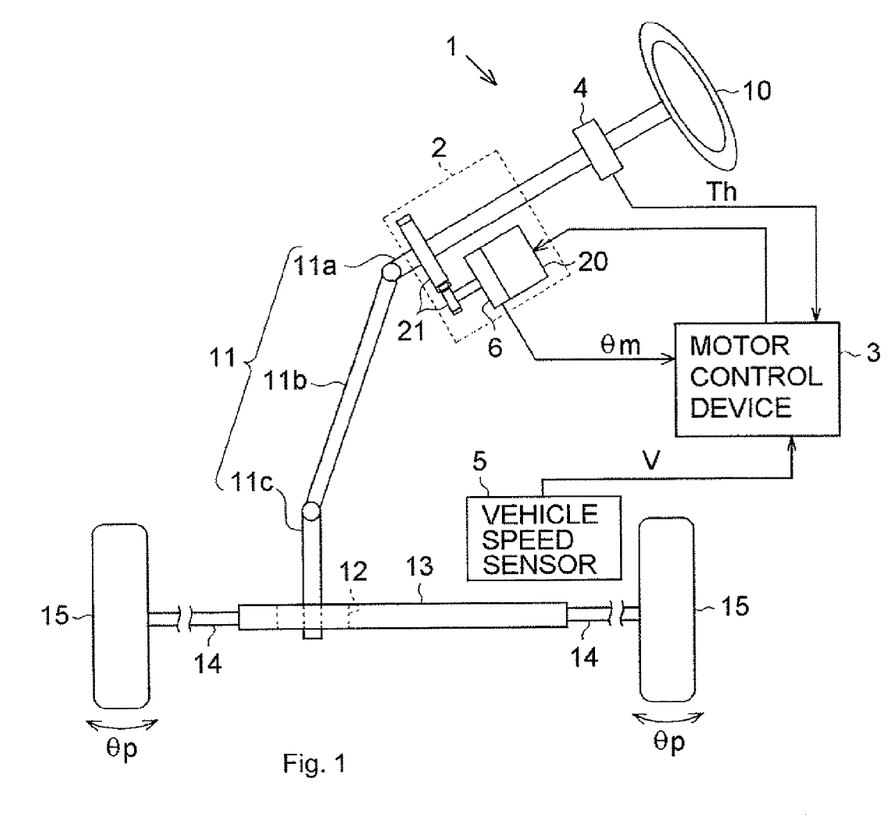
FIG. 1 is a block diagram showing a configuration of an electric power steering system according to an embodiment of the present invention.

An embodiment that embodies an electric power steering system according to the present invention will be described with reference to FIG. 1 to FIG. 6. As shown in FIG. 1, the electric power steering system includes a steering mechanism 1 that steers steered wheels 15 based on driver's operation of a steering wheel 10, and an assist mechanism 2 that assists the steering operation performed by a driver.

The steering mechanism 1 includes a steering shaft 11 that rotates together with the steering wheel 10. The steering shaft 11 is composed of a column shaft 11a connected to a center of the steering wheel 10, an intermediate shaft 11b, and a pinion shaft 11c. A rack shaft 13 is connected to a lower end portion of the pinion shaft 11c through a rack-and-pinion mechanism 11 Thus, when the steering shaft 11 rotates due to the steering operation performed by the driver, the rotational motion is converted to a linear reciprocating motion of the rack shaft 13 in an axial direction through the rack-and-pinion mechanism 12. When the linear reciprocating motion of the rack shaft 13 is transmitted to the steered wheels 15 through tie rods 14 connected to respective ends of the rack shaft 13, a steered angle $\theta p$ of the steered wheels 15 is changed, and a traveling direction of a vehicle is thus changed.

The assist mechanism 2 includes a motor 20 that applies assist torque to the column shaft 11a. The motor 20 is composed of a three-phase alternating current motor. When rotation of the motor 20 is transmitted to the column shaft 11a through a gear mechanism 21, motor torque is applied to the steering shaft 11, and the steering operation is assisted.

The electric power steering system is also provided with various sensors that detect an operation amount of the steering wheel 10 and a vehicle state amount. For example, the column shaft 11a is provided with a torque sensor 4 that detects torque (steering torque) Th applied to the steering shaft 11 when the steering operation is performed by the driver. The vehicle is provided with a vehicle speed sensor 5 that detects a traveling speed V of the vehicle. The motor 20 is provided with a rotation angle sensor 6 that detects a rotation angle θm of the motor 20. Outputs of these sensors are taken into a motor control device (a control portion) 3. The motor control device 3 controls driving of the motor 20 based on outputs of the respective sensors.

Figure 2:
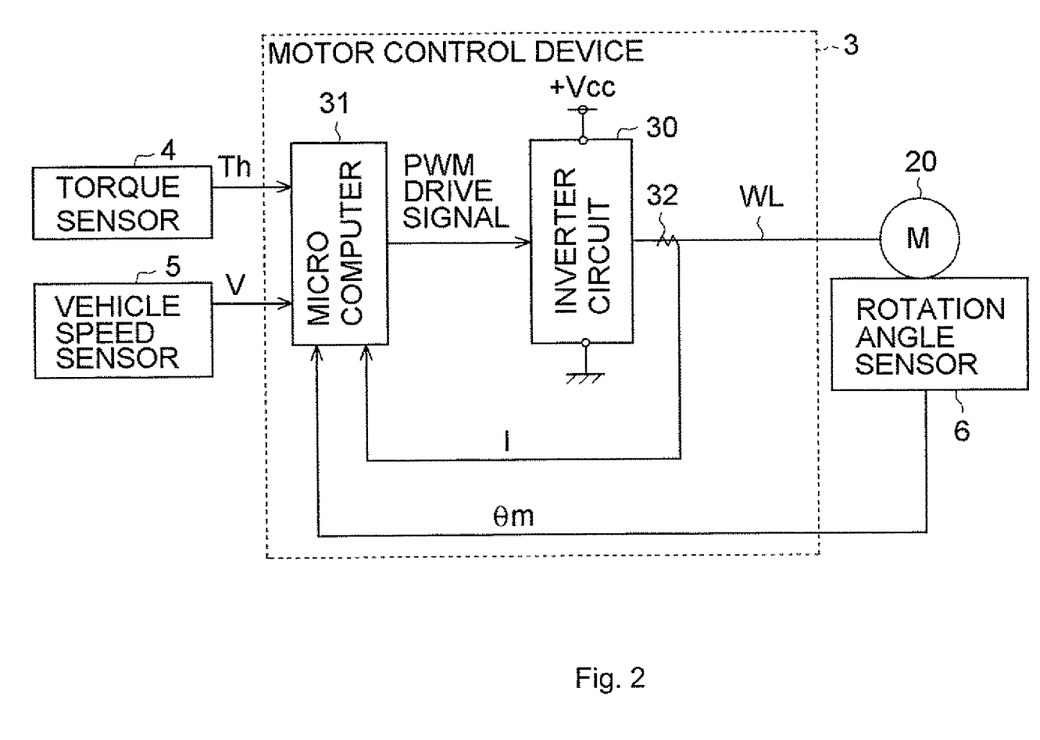
FIG. 2 is a block diagram showing a configuration of a motor control device in the electric power steering system according to the embodiment.

As shown in FIG. 2, the motor control device 3 includes an inverter circuit 30 that converts a direct current supplied from a power source (source voltage "+Vcc") such as an in-vehicle battery to alternating currents in three phases (an U phase, a V phase, and a W phase), and a microcomputer 31 that drives the inverter circuit 30 through pulse-width modulation (PWM).

The inverter circuit 30 converts the direct current supplied from the power source to the three-phase alternating currents based on a PWM drive signal from the microcomputer 31. The three-phase alternating currents are supplied to the motor 20 through an electric supply line WL.

The electric supply line WL is provided with a current sensor 32 that detects a current value I for each phase, which is the value of the current in each phase that flows through the electric supply line WL. An output of the current sensor 32 is taken into the microcomputer 31. Respective outputs of the torque sensor 4, the vehicle speed sensor 5, and the rotation angle sensor 6 are also taken into the microcomputer 31. The microcomputer 31 generates the PWM drive signal based on the steering torque Th, the vehicle speed V, the motor rotation angle θm, and the current value I for each phase that are detected by the sensors, respectively, The microcomputer 31 drives the inverter circuit 30 through PWM by outputting the PWM drive signal to the inverter circuit 30, and thus controls driving of the motor 20.

Figure 3:
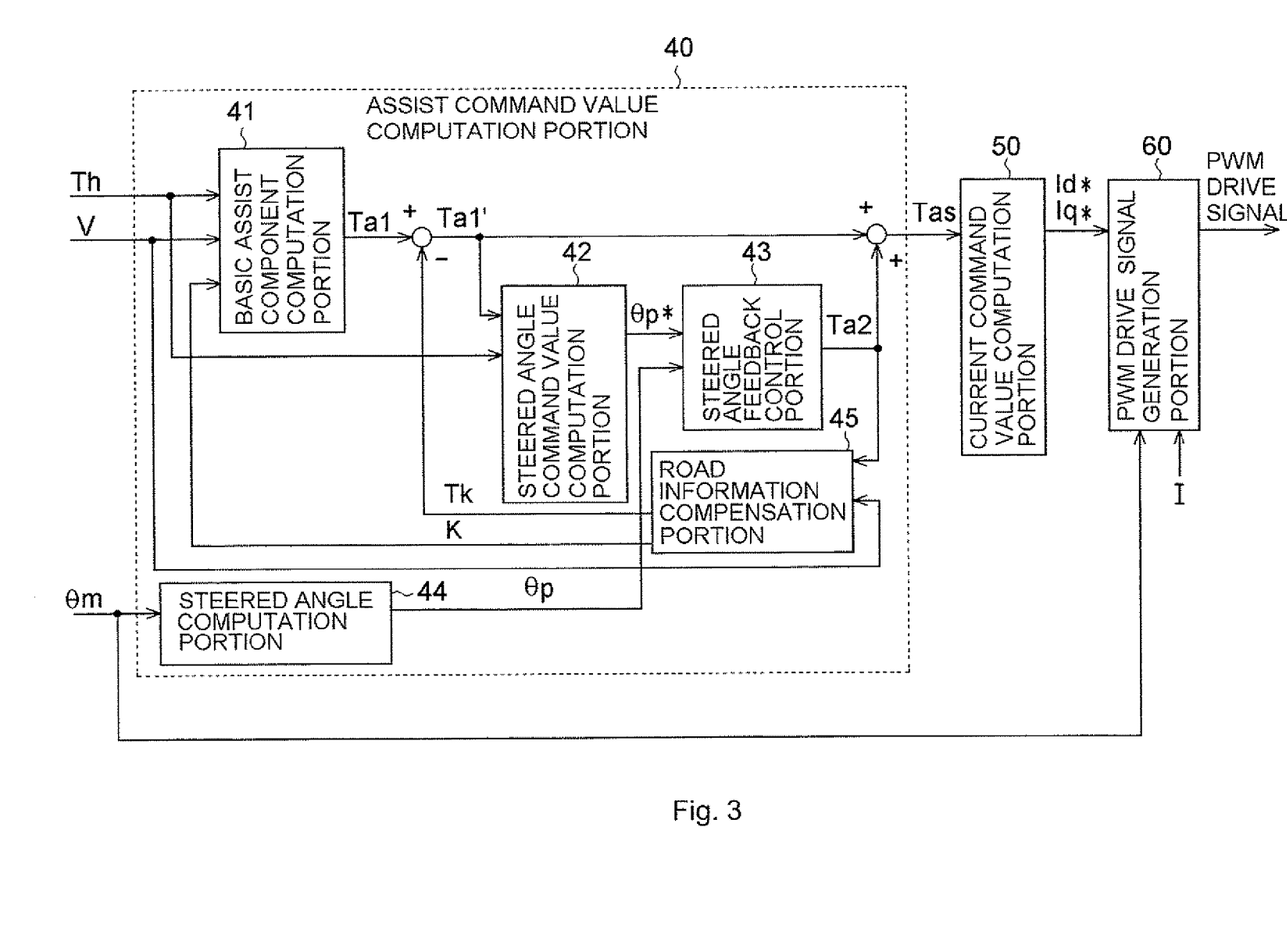
FIG. 3 is a control block diagram showing a configuration of the motor control device in the electric power steering system according to the embodiment.

Next, driving control for the motor 20 performed by the microcomputer 31 will be described in detail with reference to the control block in FIG. 3. As shown in FIG. 3, the microcomputer 31 includes an assist command value computation portion 40 that computes an assist command value Tas based on the steering torque Th, the vehicle speed V, and the motor rotation angle θm.

Figure 4:
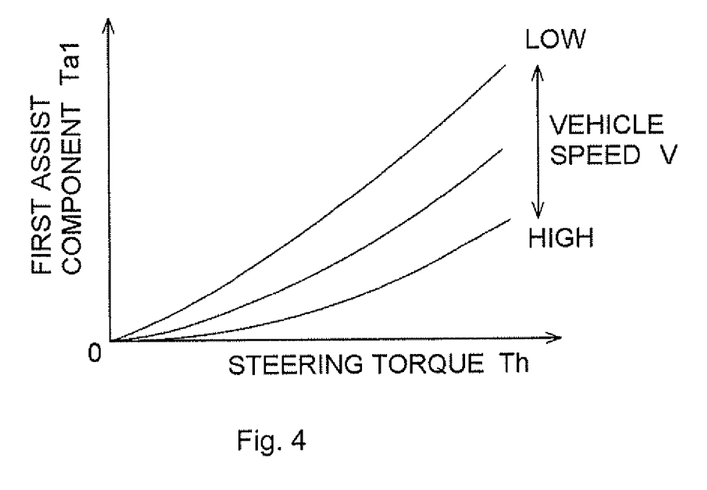
FIG. 4 is a graph showing a relationship among steering torque, a vehicle speed, and a first assist torque component.

The assist command value computation portion 40 includes a basic assist component computation portion (a first assist component computation portion) 41 that computes a first assist component Ta1 that is a base component of the assist command value Tas, based on the steering torque Th and the vehicle speed V. For example, as shown in FIG. 4, the basic assist component computation portion 41 sets an absolute value of the first assist component Ta1 so that the absolute value of the first assist component Ta1 is increased as an absolute value of the steering torque Th is increased, and as the vehicle speed V is decreased. The basic assist component computation portion 41 computes the first assist component Ta1 by using a map as shown in FIG. 4.

As shown in FIG. 3, the assist command value computation portion 40 performs correction by subtracting a correction value Tk from a value of the first assist component Ta1 calculated by the basic assist component computation portion 41, and inputs a corrected first assist component Ta1' into a steered angle command value computation portion 42.

In addition to the corrected first assist component Ta1', information on the steering torque Th is also input to the steered angle command value computation portion 42. The steered angle command value computation portion 42 obtains drive torque by adding the corrected first assist component Ta1' to the steering torque Th, and computes a steered angle command value θp* from the obtained drive torque based on an ideal model. The steered angle command value θp* is a target value of the steered angle θp. The ideal model is a model for representing an ideal steered angle corresponding to basic drive torque, and the ideal model is made in advance through experiments and so on. The steered angle command value computation portion 42 outputs the computed steered angle command value θp* to a steered angle feedback control portion 43.

Meanwhile, since the motor 20 is connected to the column shaft 11a through the gear mechanism 21 as shown in FIG. 1, there is a correlation between the motor rotation angle θm and a rotation angle of the steering shaft 11. Therefore, there is also a correlation between the motor rotation angle θm and the steered angle θp of the steered wheels 15. As shown in FIG. 3, the assist command value computation portion 40 includes a steered angle computation portion 44 that computes the steered angle θp of the steered wheels 15 from the motor rotation angle θm by using the correlation. The steered angle computation portion 44 outputs the computed steered angle θp to the steered angle feedback control portion 43.

The steered angle feedback control portion 43 generates a second assist component Ta2 by performing feedback control based on a difference between the steered angle θp and the steered angle command value θp* so that the steered angle θp is matched with the steered angle command value θp*. Thus, in this embodiment, the steered angle feedback control portion 43 serves as a second assist component computation portion.

The assist command value computation portion 40 computes the assist command value Tas by adding the second assist component Ta2 to the corrected first assist component Ta1', and outputs the assist command value Tas to a current command value computation portion 50.

The current command value computation portion 50 computes a current command value Iq* on a q-axis in a d/q coordinate system based on the assist command value Tas, and outputs the current command value Iq* to a PWM drive signal generation portion 60. In this embodiment, a current command value Id* on a d-axis is "0", and the current command value computation portion 50 also outputs the current command value Id* to the PWM drive signal generation portion 60.

In addition to the current command values Id* and Iq* from the current command value computation portion 50, information on the current value I for each phase and the motor rotation angle θm is also input to the PWM drive signal generation portion 60. The PWM drive signal generation portion 60 converts the current value I for each phase to a d-axis current value and a q-axis current value in the d/q coordinate system by using the motor rotation angle θm. The PWM drive signal generation portion 60 generates the PWM drive signal by performing feedback control based on differences between the d-axis current value and the current command value Id* and between the q-axis current value and the current command value Iq* so that the d-axis current value is matched with the current command value Id* and the q-axis current value is matched with the current command value Iq*. Thus, the inverter circuit 30 is driven through PWM, assist torque is applied to the steering shaft 11 from the motor 20, and assist control for assisting the steering operation is thus executed.

In this configuration, since the second assist component Ta2 generated by the steered angle feedback control is contained in the assist command value Tas, the steered angle θp of the steered wheels 15 is controlled to follow the steered angle command value θp*. Since the steered angle θp of the steered wheels 15 is maintained at the steered angle command value θp* by the steered angle feedback control, it is possible to appropriately suppress vibration of the steering mechanism 1 caused by disturbance. By appropriately adjusting the ideal model, an arbitrary characteristic can be formed by control regardless of actual characteristics of a vehicle in which the electric power steering system is provided. In other words, a desired steering feel is realized.

When the steered angle feedback control is performed as described above, it is possible to effectively cancel a reverse input from the steered wheels 15. However, the driver obtains much road information regarding the traveling vehicle, such as a road condition and a gripping force of the steered wheels 15, from the reverse input transmitted to the steering wheel 10 through the steering mechanism 1. Therefore, if the reverse input from the steered wheels 15 is canceled completely, the driver is unable to obtain road information from the steering wheel 10, and deterioration in the steering feel may be caused. In addition, since reverse input vibration that is generated during straight-ahead braking increases in accordance with the vehicle speed V, it is desired to suppress reverse input vibration in order to ensure vehicle traveling stability, when the vehicle is running at a high speed.

Thus, in this embodiment, an absolute value of the second assist component Ta2 contained in the assist command value Tas is adjusted so as to be decreased when the vehicle is running at a low speed. More specifically, by subtracting the correction value Tk from the first assist component Ta1, the second assist component Ta2 contained in the assist command value Tas is substantially adjusted. Details will be described below.

Figure 5:
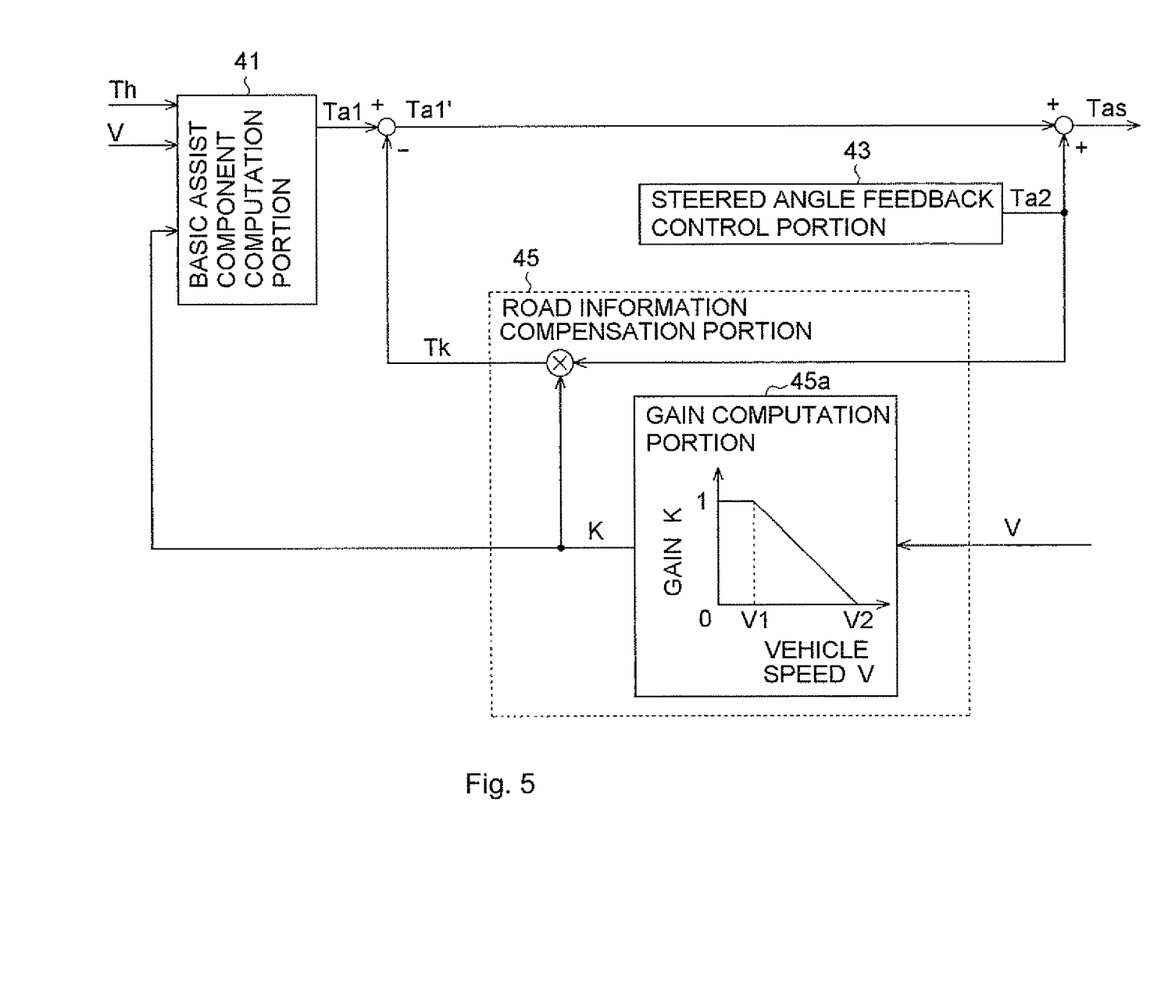
FIG. 5 is a control block diagram showing a configuration of a road information compensation portion in the electric power steering system according to the embodiment.

As shown in FIG. 3, the assist command value computation portion 40 includes a road information compensation portion 45 that computes the correction value Tk based on the second assist component Ta2 and the vehicle speed V. As shown in FIG. 5, the road information compensation portion 45 includes a gain computation portion 45a that computes a gain K based on the vehicle speed V. As shown in FIG. 5, the gain computation portion 45a sets the gain K to "1" when the vehicle is running at a low speed, that is, when the vehicle speed V is in a range of "0≤V<V1". Also, when the vehicle is running at a medium speed, that is, when the vehicle speed V is in a range of "V1≤V<V2", the gain K is linearly decreased within a range from "1" to "0" as the vehicle speed V increases. When the vehicle is running at a high speed, that is, when the vehicle speed V is in a range of "V2≤V", the gain K is set to "0".

The road information compensation portion 45 computes the correction value Tk by multiplying the second assist component Ta2 by the gain K computed by the gain computation portion 45a. Therefore, the correction value Tk, the corrected first assist component Ta1', and the assist command value Tas are calculated in accordance with the vehicle speed V, as described in (a1) to (a3) below.

(a1) The time when the vehicle is running at a low speed, that is, the time when the vehicle speed V satisfies the condition of "0≤V≤V1", In this case, since the gain K is set to "1", the correction value Tk becomes the same value as the second assist component Ta2. Therefore, the corrected first assist component Ta1' becomes "Ta1-Ta2". Thus, the assist command value Tas is "Ta1".

(a2) The time when the vehicle is running at a medium speed, that is, the time which the vehicle speed V satisfies the condition of "V1≤V<V2". In this case, since the gain K changes within a range of "1≥K>0", the correction value Tk changes within a range of "Ta2≥Tk>0". Therefore, the corrected first assist component Ta1' becomes "Ta1-K·Ta2". Thus, the assist command value Tas is "Ta1+(1-K) Ta2", (a3) The time when the vehicle is running at a high speed, that is, the time when the vehicle speed V satisfies the condition of "V2≤V". In this case, since the gain K is set to "0", the correction value Tk becomes "0". Therefore, the corrected first assist component Ta1' is "Ta1". Thus, the assist command value Tas is "Ta1+Ta2".

As described above, in this embodiment, when the gain K is set within a range from "0" to "1", the second assist component contained in the assist command value Tas is substantially adjusted to (1-K)·Ta2. In other words, the gain K represents a degree of adjustment of the second assist component Ta2. When the gain K is set to "0", the second assist component Ta2 contained in the assist command value Tas is not adjusted. When the gain K is set to "1", the second assist component contained in the assist command value Tas is completely eliminated. The road information compensation portion 45 is an adjusting portion that decreases the absolute value of the second assist component Ta2 contained in the assist command value Tas in accordance with the vehicle speed V.

In this embodiment, when the vehicle is running at a low speed, the second assist component Ta2 contained in the assist command value Tas is eliminated completely. Therefore, assist torque resulting from the steered angle feedback control does not act on the steering shaft 11. Therefore, since the reverse input from the steered wheels 15 is not canceled and transmitted to the driver, the driver is able to obtain road information. Meanwhile, as the vehicle speed V increases, the second assist component Ta2 contained in the assist command value Tas is increased, and assist torque resulting from the steered angle feedback control acts on the steering shaft 11. In particular, when the vehicle is running at a high speed, that is, when the vehicle speed V is equal to or higher than the speed V2, the reverse input from the steered wheels 15 is cancelled by assist torque resulting from the steered angle feedback control. Thus, vehicle traveling stability is adequately ensured when the vehicle is running at a high speed.

When the second assist component Ta2 contained in the assist command value Tas is adjusted as described above, characteristics of a control system are changed, and therefore, stability of the control system may not be ensured. More specifically, a case is assumed in which the control system is designed so that stability is ensured when the gain K is set to "0", in other words, when the steered angle feedback control is not limited. In this case, when the gain K is changed to, for example, "1", the second assist component Ta2 is eliminated completely from the assist command value Tas, and thus, characteristics and stability of the control system change. This makes the control system unstable, and the steering feel becomes uncomfortable for the driver due to self-induced vibration. In view of this, the basic assist component computation portion 41 is configured as shown in FIG. 6 in this embodiment.

Figure 6:
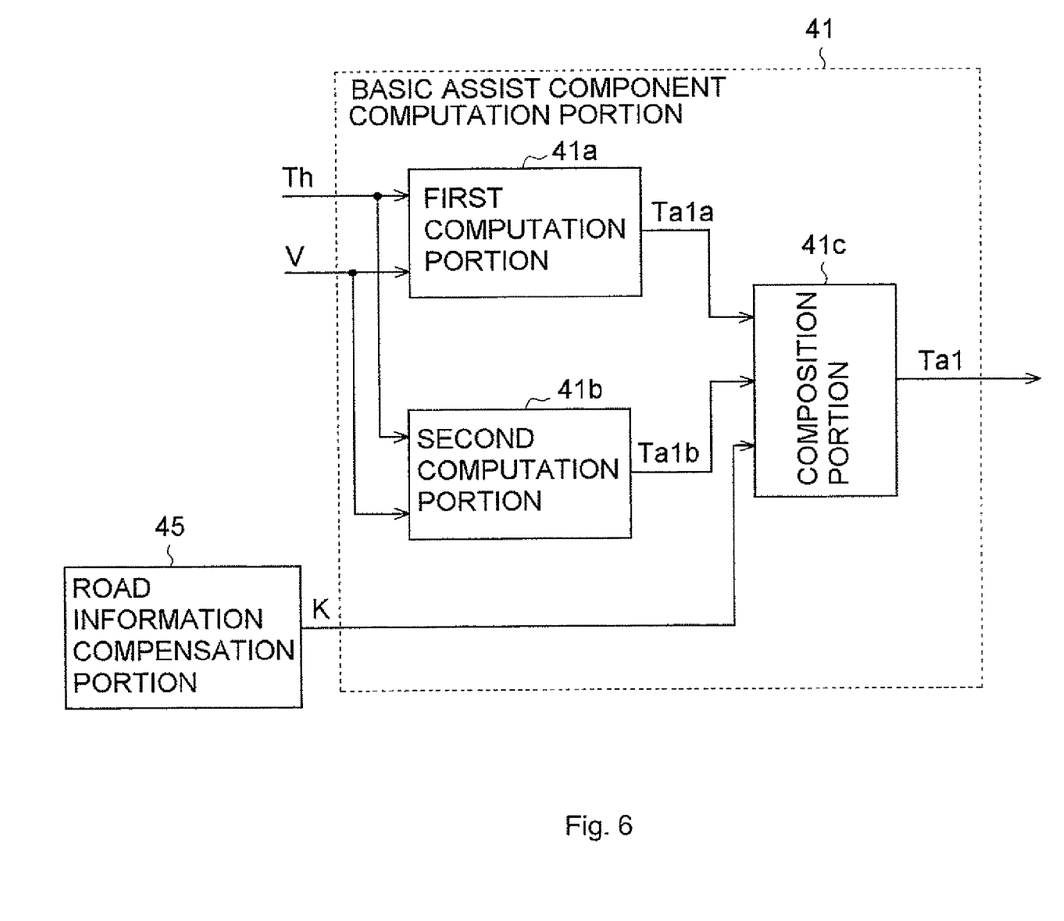
FIG. 6 is a control block diagram showing a configuration of a basic assist component computation portion in the electric power steering system according to the embodiment.

As shown in FIG. 6, the basic assist component computation portion 41 includes two computation portions 41a and 41b that are able to compute the first assist component Ta1.

The first computation portion 41a computes a primary component Ta1a from the steering torque Th and the vehicle speed V by using a map as shown in FIG. 4. The primary component Ta1a is a value of the first assist component that is able to ensure stability of the control system when the gain K is set to "0", in other words, when the second assist component Ta2 contained in the assist command value Tas is not adjusted. The second computation portion 41b computes a secondary component Ta1b from the steering torque Th and the vehicle speed V by using the map as shown in FIG. 4. The secondary component Ta1b is a value of the first assist component that is able to ensure stability of the control system when the gain K is set to "1", in other words, when the second assist component Ta2 contained in the assist command value Tas is substantially set to "0". Appropriate maps are prepared in advance for the first computation portion 41a and the second computation portion 41b, respectively, through experiments and so on. The computed primary component Ta1a and the computed secondary component Ta1b are input to a composition portion 41c.

Information on the gain K is also input to the composition portion 41c from the road information compensation portion 45. The composition portion 41c computes the first assist component Ta1 by performing linear interpolation on the primary component Ta1a and the secondary component Ta1b based on the gain K according to the following equation (1).

$$Ta1 = Ta1a + (Ta1b - Ta1a) \times K \quad (1)$$

Next, actions in this embodiment will be described. In this embodiment, when the gain K is set to "0", in other words, when the second assist component Ta2 contained in the assist command value Tas is not adjusted, the primary component Ta1a is used as the first assist component Ta1. When the gain is set to "1", in other words, when the second assist component Ta2 contained in the assist command value Tas is adjusted to be substantially "0", the secondary component Ta1b is used as the first assist component Ta1. Therefore, in either case, stability of the control system is ensured, and self-excited vibration of the control system is suppressed. As a result, the steering feel is improved.

When the gain K changes in the range from "0" to "1", the first assist component Ta1 is linearly changed within a range from the primary component Ta1a to the secondary component Ta1b. Therefore, a sudden fluctuation of the first assist component Ta1 is suppressed. This suppresses an abrupt change of assist torque, and the steering feel is thus improved.

As described so far, in the electric power steering system of this embodiment, the following effects are obtained.

(1) The assist command value computation portion 40 includes the road information compensation portion 45 that adjusts the second assist component Ta2 contained in the assist command value Tas so that the second assist component Ta2 is decreased. Thus, since the driver is able to obtain the steering feel corresponding to the road condition, the steering feel is improved.

(2) The assist command value computation portion 40 includes the first computation portion 41a that computes the primary component Ta1a serving as the first assist component Ta1 that is able to ensure stability of the control system when the gain K is set to "0", in other words, when the second assist component Ta2 contained in the assist command value Tas is not adjusted. The assist command value computation portion 40 also includes the second computation portion 41b that computes the secondary component Ta1b serving as the first assist component Ta1 that is able to ensure stability of the control system when the gain K is set to "1", in other words, when the second assist component Ta2 contained in the assist command value Tas is substantially adjusted to "0". In the assist command value computation portion 40, the first assist component Ta1 is computed based on the primary component Ta1a and the secondary component Ta1b that are computed by the two computation portions 41a and 41b, respectively. Thus, it is possible to set the first assist component Ta1 that is able to ensure stability of the control system.

(3) The assist command value computation portion 40 computes the first assist component Ta1 by performing linear interpolation on the primary component Ta1a and the secondary component Ta1b computed in the two computation portions 41a and 41b, respectively, in accordance with the gain K, in other words, the degree of adjustment of the second assist component Ta2. Therefore, it is possible to suppress a sudden fluctuation of the first assist component Ta1 relative to a change in the degree of adjustment of the second assist component Ta2. Thus, the steering feel is improved.

(4) The road information compensation portion 45 adjusts the absolute value of the second assist component Ta2 contained in the assist command value Tas so that the absolute value of the second assist component Ta2 is decreased as the vehicle speed V is decreased. Therefore, since the absolute value of the second assist component Ta2 contained in the assist command value Tas is decreased as the vehicle speed V is decreased, the reverse input from the steered wheels 15 is not canceled by assist torque, and is more likely to be transmitted to the driver as road information. Since the absolute value of the second assist component Ta2 contained in the assist command value Tas is increased as the vehicle speed V is increased, reverse input vibration from the steered wheels 15 is canceled by assist torque resulting from the steered angle feedback control, and the vehicle traveling stability is able to be ensured adequately.

The foregoing embodiment may be implemented in the following forms in which the foregoing embodiment is appropriately changed.

In the foregoing embodiment, although the gain K is changed in accordance with the vehicle speed V, it is desirable that, during braking, the gain K be made closer to "1" in a manner such that the second assist component Ta2 contained in the assist command value Tas does not become too small. During braking, vibration at a relatively high frequency, which is easily recognized as noise, is caused. However, by performing the steered angle feed back control to effectively exert the vibration suppressing action as described above, reverse input vibration, which becomes noise, is suppressed effectively. Unless the gain K is set to "1", the driver is also able to obtain road information.

In the foregoing embodiment, the gain K is set based on the vehicle speed V. Instead, for example, the gain K may be set manually by the driver. Thus, since the driver is able to manually adjust the second assist component Ta2 contained in the assist command value Tas, the driver is able to arbitrarily adjust the steering feel of the vehicle. Therefore, a desired steering feel for a driver is realized. In short, it is necessary that the absolute value of the second assist component Ta2 contained in the assist command value Tas be adjustable so as to be decreased by variably setting the gain K.

In the foregoing embodiment, the composition portion 41c computes the first assist component Ta1 based on the equation (1). Instead, for example, the first assist component Ta1 may be computed as shown in (b1) and (b2) below.

(b1) When the gain K satisfies the condition of "0≤K<0.5", the primary component Ta1a computed by the first computation portion 41a is used as the first assist component Ta1.

(b2) When the gain K satisfies the condition of "0.5≤K≤1", the secondary component Ta1b computed by the second computation portion 41b is used as the first assist component Ta1. With this configuration as well, self-excited vibration is unlikely to occur in the control system, and thus, the steering feel is improved.

In the foregoing embodiment, the first assist component Ta1 is set by using the gain K. However, the first assist component Ta1 may be set without using the gain K. More specifically, the first assist component Ta1 is first set to the primary component Ta1a that is computed by the first computation portion 41a. Then, if self-excited vibration of the control system is detected when the first assist component Ta1 is set to the primary component Ta1a, the first assist component Ta1 is switched to the secondary component Ta1b that is computed by the second computation portion 41b. If self-excited vibration of the control system is detected when the first assist component Ta1 is set to the secondary component Ta1b, the first assist component Ta1 is returned to the primary component Ta1a. With this configuration as well, self-excited vibration of the control system is suppressed, and thus, the steering feel is improved. In short, regardless of whether or not the gain K is used, it is necessary that the first assist component Ta1 be computed based on the primary component Ta1a and the secondary component Ta1b that are computed by the two computation portions 41a and 41b, respectively.

In the foregoing embodiment, the two computation portions 41a and 41b are provided. The two computation portions 41a and 41b respectively compute values of the first assist component Ta1, which are able to ensure stability of the assist control when the gain K is set to "0" and "1". Instead, for example, three computation portions may be provided to respectively compute assist components that are values of the first assist component Ta1, which are able to ensure stability of the assist control when the gain K is set to "0", "0.5", and "1", and the first assist component Ta1 may be computed based on the assist components computed by the above-mentioned computation portions, respectively. Alternatively, two computation portions may be provided to respectively compute assist components that are values of the first assist component Ta1, which are able to ensure stability of the assist control when the gain K is set to "0.5" and "1", and the first assist component Ta1 may be computed based on the assist components computed by the above-mentioned computation portions, respectively. With any of the configurations, it is possible to compute the first assist component Ta1 that is able to ensure stability of the assist control. In short, it is necessary that a plurality of computation portions be provided to respectively compute assist components that are values of the first assist component Ta1, which are able to ensure stability of the assist control when the gain K is set to a plurality of values, and that the first assist component Ta1 be computed based on the assist components computed by the computation portions, respectively.

In the foregoing embodiment, the gain K is set within a range from "0" to "1". However, for example, the gain K may be set within a range from "0.5" to "1".

The ideal model may be changed as appropriate. For example, an ideal model, in which the steered angle command value θp* is set based on only the steering torque Th, may be used.

The steered angle command value computation portion 42 is not limited to one that computes the steered angle command value θp* by using the ideal model. For example, the steered angle command value computation portion 42 may compute the steered angle command value θp* by using a map, like the basic assist component computation portion 41.

The torque sensor 4 may be provided at an appropriate location of the steering mechanism 1 such as the intermediate shaft 11b or the pinion shaft 11c, as long as the torque sensor 4 is able to detect the steering torque Th.

In the foregoing embodiment, the rotation angle sensor 6 and the steered angle computation portion 44 are used as a sensor that detects the steered angle θp of the steered wheels 15, but the present invention is not limited to this configuration. For example, a sensor that detects a rotation angle of the steering shaft 11, a sensor that directly detects the steered angle θp of the steered wheels 15, or the like may be used.

The steered angle feedback control may be performed by using a rotation angle of an appropriate rotary shaft, which can be converted to the steered angle θp, such as a rotation angle of the intermediate shaft 11b, or a rotation angle of the pinion shaft 11c.

Although the basic assist component computation portion 41 sets the first assist component Ta1 based on the steering torque Th and the vehicle speed V, the first assist component Ta1 may be set based on, for example, only the steering torque Th. Alternatively, so-called phase compensation control may be performed to change a phase of the detected steering torque Th from the torque sensor 4, based on a change gradient of the first assist component Ta1 (an assist gradient) with respect to the steering torque Th. So-called torque derivative control may also be performed to increase the first assist component Ta1 as a derivative value of the first assist component Ta1 increases.

In the foregoing embodiment, the present invention is applied to the electric power steering system that applies assist torque to the column shaft 11a. Instead, for example, the present invention may be applied to an electric power steering system that applies assist torque to the pinion shaft 11c, or an electric power steering system that applies assist torque to the rack shaft 13.

What is claimed is:

1. An electric power steering system comprising:
an assist mechanism that applies assist torque from a motor to a vehicle steering mechanism; and
a control portion that controls driving of the motor based on an assist command value,
wherein the control portion includes:
a first assist component computation portion that computes a first assist component based on steering torque transmitted to the vehicle steering mechanism;
a steered angle command value computation portion that computes a steered angle command value, which serves as a target value of a steered angle of steered wheels, based on the steering torque;
a second assist component computation portion that computes a second assist component by performing steered angle feedback control that matches the steered angle of the steered wheels with the steered angle command value;
an assist command value computation portion that computes the assist command value based on a value obtained by adding the second assist component to the first assist component; and
an adjusting portion that adjusts an absolute value of the second assist component contained in the assist command value so that the absolute value of the second assist component is decreased, based on a given condition, and wherein the first assist component computation portion computes the first assist component in accordance with a degree of adjustment of the second assist component when the second assist component is adjusted by the adjusting portion, the degree of adjustment decreasing as a vehicle speed increases.

2. The electric power steering system according to claim 1, wherein the first assist component computation portion includes a plurality of computation portions that compute assist components that are values of the first assist component, which ensure stability of a control system, in accordance with the degree of adjustment of the second assist component, and the first assist component computation portion computes the first assist component based on the assist components that are computed by the plurality of computation portions, respectively.

3. The electric power steering system according to claim 2, wherein the first assist component computation portion includes, as the plurality of computation portions:

a first computation portion that computes a primary component that is a value of the first assist component, which ensures stability of the control system when the second assist component contained in the assist command value is not adjusted; and a second computation portion that computes a secondary component that is a value of the first assist component, which ensures stability of the control system when the second assist component contained in the assist command value is adjusted to "0", and wherein the first assist component computation portion computes the first assist component based on the primary component and the secondary component.

4. The electric power steering system according to claim 3, wherein the first assist component computation portion computes the first assist component by performing linear interpolation on the primary component and the secondary component in accordance with the degree of adjustment of the second assist component.

5. The electric power steering system according to claim 1, wherein the adjusting portion adjusts the absolute value of the second assist component contained in the assist command value so that the absolute value of the second assist component is decreased as the vehicle speed is decreased.

* * * * *